United States Patent
Shaked

(10) Patent No.: US 10,594,698 B2
(45) Date of Patent: Mar. 17, 2020

(54) METHODS AND SYSTEMS FOR CONTROLLING THE EXCHANGE OF FILES BETWEEN AN ENTERPRISE AND A NETWORK

(71) Applicants: Chen Shaked, Rishon LeZion (IL); Mordechai Caro, Modiin (IL); Anatoli Rasumovich, Bat Yam (IL)

(72) Inventor: Chen Shaked, Rishon LeZion (IL)

(73) Assignees: Chen Shaked, Rishion Lezion (IL); Mordechai Caro, Modin (IL); Anatoli Rasumovich, Yam (IL)

( * ) Notice: Subject to any disclaimer, the term of this patent is extended or adjusted under 35 U.S.C. 154(b) by 92 days.

(21) Appl. No.: 15/585,218

(22) Filed: May 3, 2017

(65) Prior Publication Data
US 2018/0316674 A1    Nov. 1, 2018

(51) Int. Cl.
*H04L 29/06* (2006.01)

(52) U.S. Cl.
CPC .......... *H04L 63/10* (2013.01); *H04L 63/0245* (2013.01); *H04L 63/0428* (2013.01); *H04L 63/083* (2013.01); *H04L 63/145* (2013.01); *H04L 63/1408* (2013.01); *H04L 63/1416* (2013.01); *H04L 63/20* (2013.01)

(58) Field of Classification Search
CPC ....... H04L 63/08; H04L 63/083; H04L 63/10; H04L 63/1408; H04L 63/1416; H04L 63/0245
See application file for complete search history.

(56) References Cited

U.S. PATENT DOCUMENTS

| 9,813,285 B1* | 11/2017 | McGovern | G06F 21/316 |
| 2003/0055994 A1* | 3/2003 | Herrmann | H04L 12/2856 |
| | | | 709/229 |
| 2003/0097597 A1* | 5/2003 | Lewis | H04L 63/083 |
| | | | 726/7 |
| 2006/0100065 A1* | 5/2006 | Maresh | A63B 22/0007 |
| | | | 482/52 |

(Continued)

FOREIGN PATENT DOCUMENTS

EP    3076327    *   9/2015

OTHER PUBLICATIONS

Ali Bagherzandi et al., Password-Protected Secret Sharing, Oct. 2011, ACM, pp. 433-443. (Year: 2011).*

(Continued)

*Primary Examiner* — Luu T Pham
*Assistant Examiner* — Fahimeh Mohammadi
(74) *Attorney, Agent, or Firm* — The Roy Gross Law Firm, LLC; Roy Gross

(57) ABSTRACT

Computerized methods and systems receive password-protected data from a network at an entity coupled to the network. The password-protected data is intended for receipt by a user of an endpoint coupled to the network, and a password is assigned to the password-protected data which allows access to the password-protected data. The entity attempts to access the password-protected data by applying a set of rules and policies to the password-protected data. The entity requests the assigned password from a user of the endpoint, based on the outcome of the rules and policies, to determine whether the password-protected data includes potentially malicious components.

13 Claims, 6 Drawing Sheets

(56) References Cited

U.S. PATENT DOCUMENTS

| | | | | |
|---|---|---|---|---|
| 2007/0143827 A1* | 6/2007 | Nicodemus | ......... | G06F 21/6218 726/2 |
| 2008/0148039 A1* | 6/2008 | Cobb | ................. | G06F 11/3612 713/100 |
| 2009/0007249 A1* | 1/2009 | Lu | ...................... | G06F 21/6218 726/9 |
| 2009/0300772 A1* | 12/2009 | Al-Azzawi | ............. | G06F 21/12 726/26 |
| 2012/0272339 A1* | 10/2012 | Kumaravel | ......... | G06F 21/6209 726/30 |
| 2013/0014107 A1* | 1/2013 | Kirchhofer | ........... | G06F 9/5083 718/1 |
| 2014/0040643 A1* | 2/2014 | Rotem | .................. | G06F 1/3203 713/320 |
| 2014/0165070 A1* | 6/2014 | Persikov | ............... | G06F 9/4881 718/103 |
| 2014/0244523 A1* | 8/2014 | Lorsch | .................. | G06Q 10/10 705/311 |
| 2015/0207628 A1* | 7/2015 | Hilla | ..................... | H04L 9/3226 714/758 |
| 2016/0373469 A1* | 12/2016 | Howard | ................ | G06F 21/567 |
| 2017/0200001 A1* | 7/2017 | Bhullar | ................ | H04L 63/083 |

OTHER PUBLICATIONS

Martin Husak et al., Security Monitoring of HTTP Traffic Using Extended Flows, Oct. 19, 2015, IEEE, pp. 258-265. (Year: 2015).*

Farid Daryabar et al., Investigation of Bypassing Malware Defences and Malware Detections, Jan. 5, 2012, IEEE, pp. 173-178. (Year: 2012).*

Fara Yahya et al., Protecting Data in Personal Cloud Storage with Security Classifications, Jul. 28-30, 2015, IEEE, pp. 838-843. (Year: 2015).*

\* cited by examiner

METHODS AND SYSTEMS FOR CONTROLLING THE EXCHANGE OF FILES BETWEEN AN ENTERPRISE AND A NETWORK

TECHNICAL FIELD

The present invention relates to methods and systems for detecting potential malware and restricted information.

BACKGROUND OF THE INVENTION

Protection of computer related assets, of enterprise systems, from malware attacks and exfiltration is of high importance. Such assets may include sensitive data stored on the computers of the enterprise, as well as the computers themselves, and related components. Enterprise systems may deploy software, such as, for example, anti-virus, anti-spyware, anti-malware and firewalls to protect the computers and the data stored thereon against malware and other malicious attacks. Enterprise systems may also deploy data loss prevention (DU) software to protect data from data breaches, such as, exfiltration transmissions of sensitive data and information to computers outside of the enterprise. Such breaches may be performed knowingly, or unknowingly, by users of the computers of the enterprise. However, anti-virus and DLP software may be unable to detect incoming malware and data breaches (i.e., exfiltration) when the parties sending the malware or exfiltrating the data protect the malware or exfiltrated data using password-protected archive file techniques.

SUMMARY OF THE INVENTION

The present invention is directed to computerized methods and systems, which detect password-protected data items (i.e., files) addressed to or sent from an endpoint client of an enterprise, and request from appropriate users the password assigned to the password-protected data items in order to analyze the password-protected data items for potential threats. The computerized methods and systems request the assigned password from the user of the endpoint client if brute force attempts to access the password-protected data item are unsuccessful.

Embodiments of the present invention are directed to a method for receiving data over a network. The method comprises: receiving password-protected data from the network, at an entity coupled to the network, the password-protected data intended for receipt by a user of an endpoint coupled to the network, and having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes potentially malicious components.

Optionally, the method further comprises: receiving the assigned password, in response to the requesting, from the user of the endpoint.

Optionally, the method further comprises: adding the received assigned password to a listing of potential passwords.

Optionally, the method further comprises: applying the received assigned password to the password-protected data; and accessing the password-protected data.

Optionally, the method further comprises: analyzing the accessed password-protected data to determine whether the password-protected data includes malicious components.

Optionally, the method further comprises: taking at least one protective action to protect the endpoint, in the absence of receiving the assigned password, in response to the requesting, from the user of the endpoint.

Optionally, the entity includes a gateway.

Optionally, the gateway receives the password-protected data from a mail server installed between the endpoint and the network.

Optionally, the gateway receives the password-protected data from a secure data transmission system having at least one component installed between the endpoint and the network.

Optionally, the password-protected data is encrypted.

Optionally, the applying the set of rules and policies includes applying a series of potential passwords to the password-protected data.

Optionally, the password-protected data includes at least one malicious component.

Embodiments of the present invention are directed to a gateway for receiving data over a network. The gateway comprises: a storage medium for storing computer components; and a computerized processor for executing the computer components. The computer components comprise: a computer module configured for: receiving password-protected data from the network, the password-protected data intended for receipt by a user of an endpoint coupled to the network and the gateway, and having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes potentially malicious components.

Optionally, the password-protected data is received from a mail server installed between the endpoint and the network.

Optionally, the password-protected data is received from a secure data transmission system having at least one component installed between the endpoint and the network.

Optionally, the gateway is deployed in a sandboxed environment isolating the password-protected data, when accessed, from the endpoint.

Optionally, the password-protected data includes at least one malicious component.

Embodiments of the present invention are directed to a computer usable non-transitory storage medium having a computer program embodied thereon for causing a suitable programmed system to store data items, by performing the following steps when such program is executed on the system. The steps comprise: receiving password-protected data from the network, the password-protected data intended for receipt by a user of an endpoint coupled to the network and the gateway, and having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes potentially malicious components.

Embodiments of the present invention are directed to a method for preventing exfiltration of data by an endpoint over a network. The method comprises: receiving password-protected data from the endpoint, at an entity installed between the endpoint and the network, the password-protected data having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes restricted information.

Optionally, the method further comprises: receiving the assigned password, in response to the requesting, from the user of the endpoint.

Optionally, the method further comprises: applying the received assigned password to the password-protected data; and accessing the password-protected data.

Optionally, the method further comprises: analyzing the accessed password-protected data to identify restricted information contained in the password-protected data.

Optionally, the endpoint is part of an enterprise, and the password-protected data is addressed to a device coupled to the network that is outside of the enterprise, and the method further comprises: blocking transmission of the password-protected data by the endpoint to the device, should the analyzing identify restricted information contained in the password-protected data, Embodiments of the present invention are directed to a gateway for preventing exfiltration of data by an endpoint over a network. The gateway comprises: a storage medium for storing computer components; and a computerized processor for executing the computer components. The computer components comprise: a computer module configured for: receiving password-protected data from the endpoint, at an entity installed between the endpoint and the network, the password-protected data having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes restricted information.

Embodiments of the present invention are directed to a computer usable non-transitory storage medium having a computer program embodied thereon for causing a suitable programmed system to store data items, by performing the following steps when such program is executed on the system. The steps comprise: receiving password-protected data from the endpoint, at an entity installed between the endpoint and the network, the password-protected data having an assigned password allowing access to the password-protected data; applying a set of rules and policies to the password-protected data to attempt to access the password-protected data; and based on the outcome of the applied rules and policies, requesting the assigned password from a user of the endpoint to access the password-protected data and determine whether the password-protected data includes restricted information.

This document references terms that are used consistently or interchangeably herein. These terms, including variations thereof, are as follows:

A "computer" includes machines, computers and computing or computer systems (for example, physically separate locations or devices), servers, gateways, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "gateway" is typically a remote computer or remote computer system, or computer program therein, in accordance with the "computer" defined above, that is accessible over a communications medium, such as a communications network or other computer network, including the Internet. A "gateway" provides services to, or performs functions for, other computer programs (and their users), in the same or other computer systems, A server may also include a virtual machine, a software based emulation of a computer or computer system.

A "data item" refers to objects that contain data elements which can be stored on a computer system, for example, in a memory or the like, and which may be propagated between a computer system and a peripheral device or memory, connected or linked to the computer system via a data connection or a network connection. Types of data items include files of different file types having file extensions which include, but are not limited to, *.doc, *.docx, *.xls, *.xlsx, *.ppt, *.pptx, *.pdf, *.rtf, *.txt, *.html, *.js, *.mht, *.tiff, *.bmp, *.jpg, *.gif, *.mp3, *.wav, *.m4a, *.avi, *.wmv, and *.mp4 file extensions. Data items may also include executable files (i.e., files with *.exe extensions), which may deploy software when executed by a program or process on a computer, and in malicious instances may deploy malware or other malicious code.

An "archive file" refers to a file used to hold one or more data items in a convenient manner for storage and transmission. Archive files are generally considered to be benign, but can be used for malicious intent if used to extract a malicious tile or hide restricted information for exfiltration. Typically, data items stored in archive files are stored in a compressed format and are encrypted and/or password-protected in order to prevent unauthorized access to the data items. The compression/encryption/password-protection preserves the content and capabilities of the data items stored therein. The terms "archive file", "encrypted archive file", "encrypted file", "password-protected archive file", and "password-protected file" are used equivalently and interchangeably herein. Anti-virus and. DLP software are typically unable to inspect the data items stored in such types of archive files. Types of archive files include, but are not limited to zip, rar, 7z, gzip, tar, bzip2, and cab, files.

The term "linked" as used herein includes both wired or wireless links, either direct or indirect, and placing the computers, including, gateways, server, components and the like, in electronic and/or data communications with each other.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention.

In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1 is a diagram illustrating a system environment in which an embodiment of the invention is deployed;

FIG. 2 is a diagram illustrating a system environment in which a further embodiment of the invention is deployed;

FIG. 3 is a diagram illustrating a system environment in which a further embodiment of the invention is deployed;

FIG. 4 is a diagram of the architecture of an exemplary system embodying the invention;

FIG. 5 is a flow diagram illustrating a process for receiving data items according to an embodiment of the invention; and FIG. 6 is a flow diagram illustrating a process for preventing exfiltration of data items according to an embodiment of the invention.

DESCRIPTION OF THE PREFERRED EMBODIMENTS

Figure 1:
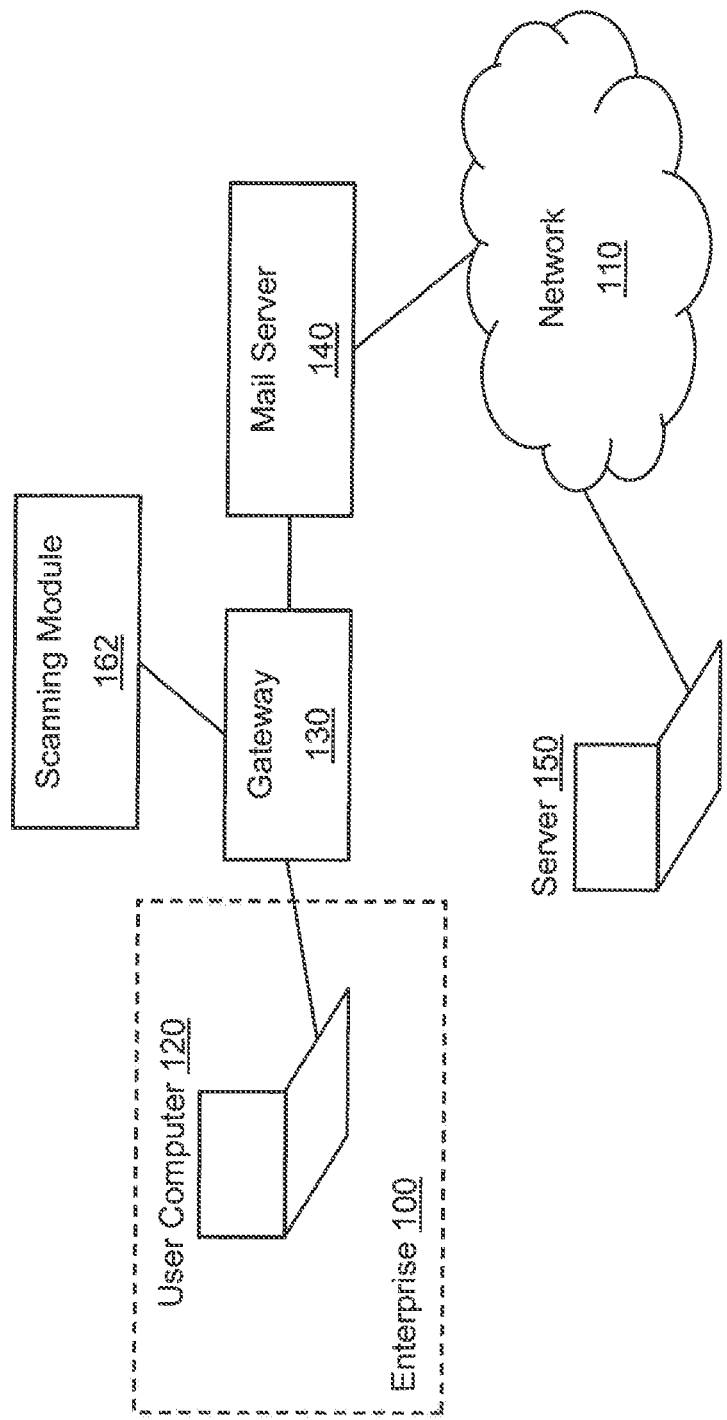

The present invention is directed to computerized methods and systems, which detect password-protected data items (i.e., files) intended for receipt by, or sent from, an endpoint client over a network, and request from users of the endpoint client the password assigned to the password-protected data items in order to analyze the password-protected data items for potential threats. An agent, preferably installed on an entity (e.g., a gateway) deployed between the endpoint client and the network, detects such password-protected data items. When such a data item is detected, the agent performs a brute force attempt to access the password-protected data item. The brute force attempt may be, for example, applying a list of potential passwords, gleaned from a source or database, to the password-protected data item. Should the agent be unable to access the password-protected data item using the brute force attempt, the agent sends a request to the user of the endpoint to provide the password assigned to the password-protected data item. Upon receipt of the assigned password from the user, the agent applies the assigned password to access the password-protected data item, in order to inspect the accessed data item for potential threats.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2:
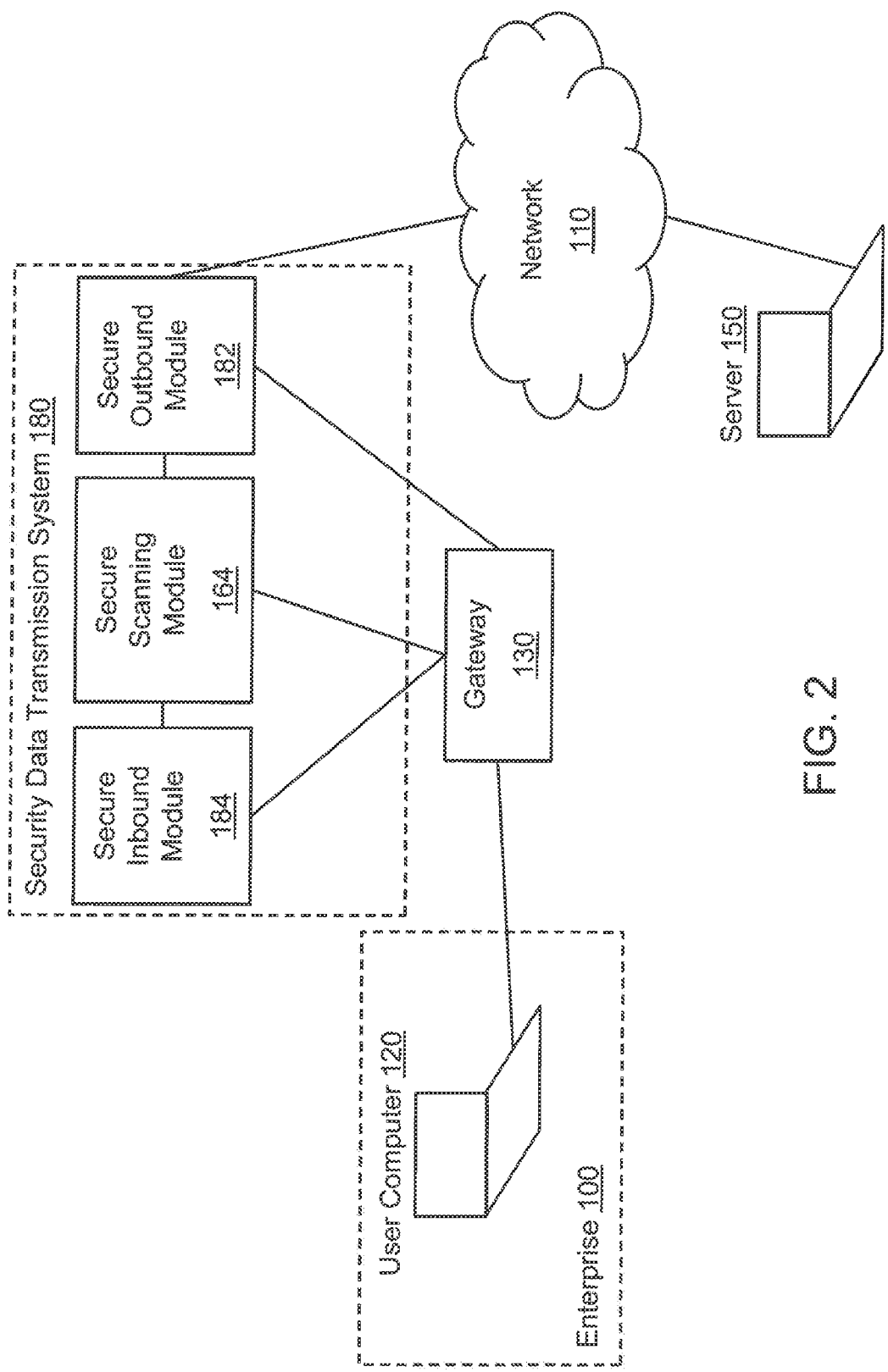
Figure 3:
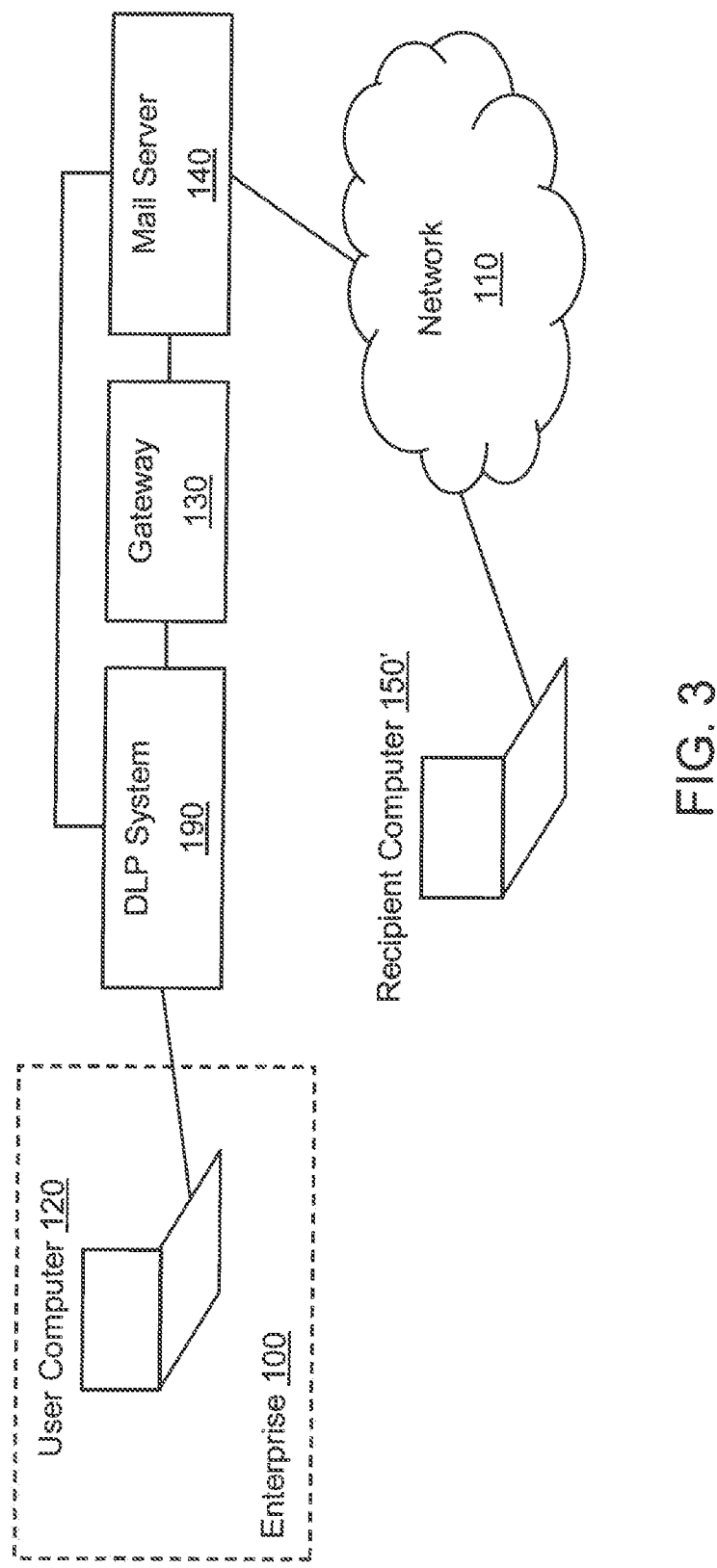

Refer now to FIGS. 1-3, illustrative example environments in which embodiments of the present disclosure may be performed over a network 110. The network 110 may be formed of one or more networks, including, for example, the Internet, cellular networks, wide area, public, and local networks. The embodiments include a system 170 (FIG. 4), including, for example, an agent 160, installed on a gateway 130 connected to an endpoint client, for example, a user computer 120 (linked to the network 110). The user computer 120 may be part of an enterprise 100 linked to the network 110, which includes multiple computers similar to the user computer 120, which are linked to each other via private network, such as, for example, an Intranet.

According to certain embodiments of the present disclosure, the gateway 130 is connected to a server 140 (FIG. 1), which may be, for example, a mail (i.e., electronic mail or e-mail) server or mail relay. In such embodiments, the user computer 120 includes a mail client (not shown) that is operable with the mail server 140, for sending and receiving e-mail via the network 110. In such embodiments, password-protected data items are sent to the user computer 120 from a server 150 linked to the network 110. The host server 150 represents numerous servers hosting, for example, e-mail clients, accessible through e-mail server applications, in such embodiments, the password-protected data items are sent as e-mail attachments from a sender, via the host server 150 through the mail server 140. The user computer 120 may receive a password assigned to a password-protected data item, which is required for accessing the password-protected data item. The assigned password may be sent to the user computer 120 in the e-mail from the sender that includes the password-protected data item attachment. The gateway 130, installed between the user computer 120 and the network 110, receives the password-protected data items prior to access and/or execution by the user computer 120. The gateway 130 performs operations on the password-protected data items in order access the password-protected data items for inspection by a scanning module 162, which performs analysis on accessed password-protected data items for the presence of malicious components.

According to certain embodiments of the present disclosure, the gateway 130 is connected to a secure data transmission system 180 (FIG. 2), which may include secure inbound and outbound modules 184, 182. In such embodiments, data items (e.g., password-protected data items) are sent to the user computer 120 from the server 150, which may be a secure server that provides a secure channel of communication for transmission of the password-protected data items over the network 110. The secure channel of communication prevents tampering or access (by unauthorized parties) to data items while in transit between the server 150 and the user computer 120. In such embodiments, for example, the data items may be received by the secure outbound module 182, which provides the data items to the gateway 130. Subsequent to processing of the data items by the agent 160, of the gateway 130, the data items may be provided to the secure inbound module 184 for handling. Similar to the embodiments described above with reference to FIG. 1, the gateway 130 performs operations on the password-protected data items in order access the secure password-protected data items for inspection by a secure scanning module 164, which performs analysis on accessed password-protected data items for the presence of malicious components.

According to certain embodiments of the present disclosure, the gateway is connected to a data loss prevention (DLP) system 190 in addition to the mail server 140. In such embodiments, password-protected data items are sent from the user computer 120 to an intended recipient computer 150', linked to the network 110. The DLP system 190 and the gateway 130 are installed between the user computer 120 and the network 110. In such embodiments, the agent 160, installed on the gateway 130, in cooperation with the DLP system 190, prevents exfiltration of restricted information contained within the password-protected data items. Within the context of this document, the term "restricted information" generally refers to information present on the user computer 120 or the enterprise 100, that is private or sensitive and should not otherwise be distributed to computers outside of the enterprise 100.

The agent 160 includes software, software routines, code, code segments and the like, embodied, for example, in computer components, modules and the like, that are installed on machines, such as the gateway 130. For example, the agent 160 performs an action when a specified event occurs, as will be further detailed below. The agent 160 may be instructed to perform such actions by an administrator of the enterprise 100. Further, the agent 160 may provide instructions to the various network entities that facilitate the transmission (i.e., exchange) of data items (e.g., the mail server 140, the DLP system 190, and the secure data transmission system 180) to perform actions.

Figure 4:
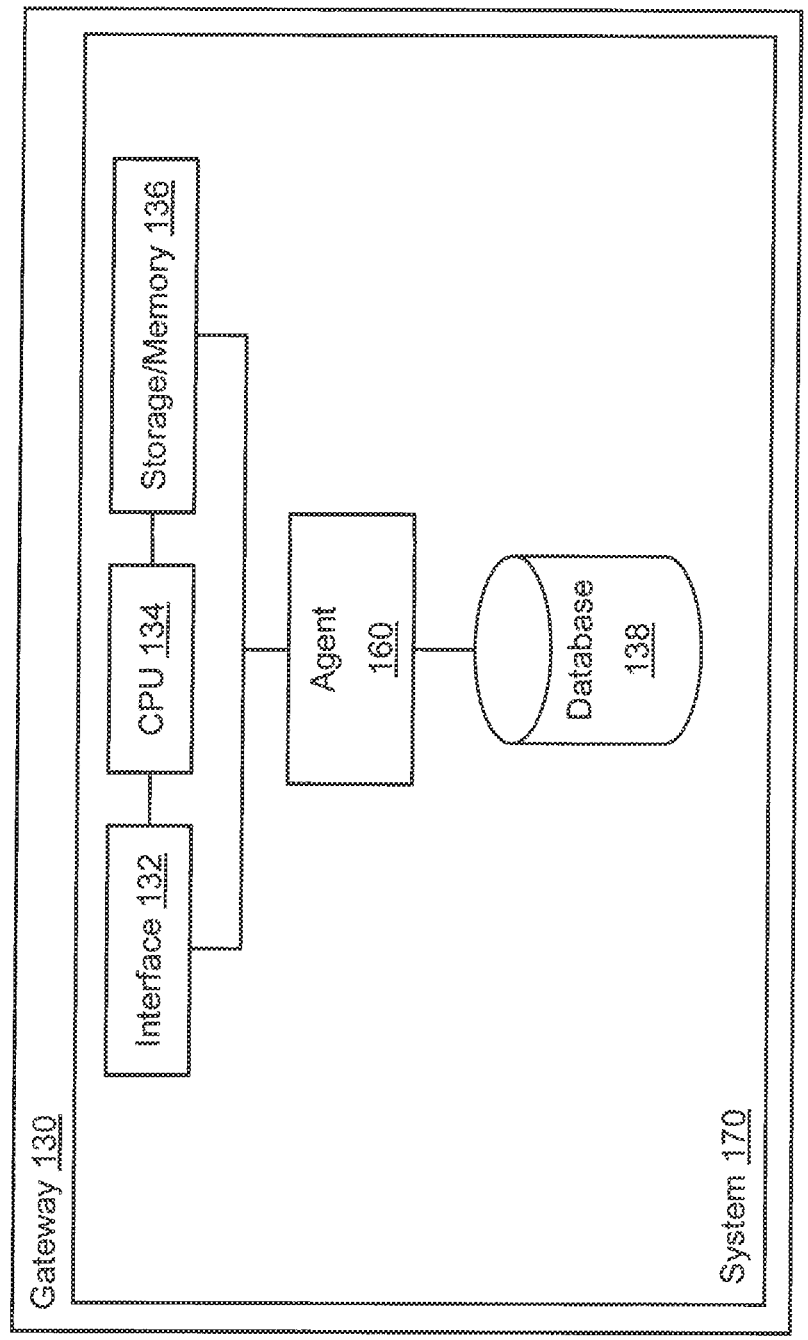

FIG. 4 shows the gateway 130 and the system 170 therein, as an architecture, with the agent 160 incorporated into the system 170. The system 170 is referred to as "the system" in the description of FIGS. 5 and 6 below. All components of the gateway 130 and/or the system 170 are connected or linked to each other (electronically and/or data), either directly or indirectly. As mentioned above, in the embodiments of the present disclosure, the gateway 130 operates in cooperation with the various network entities that facilitate the exchange of data items (e.g., the mail server 140, the DLP system 190, and the secure data transmission system 180). Although the system 170 is illustrated in FIG. 4 as being installed on the gateway 130, the system 170, in principle, includes the components of the gateway 130 as well as the relevant network entity with which the gateway 130 cooperates.

For example, in the embodiments illustrated in FIG. 1, the system 170 includes the components of the gateway 130 as well as the scanning module 162 and the mail server 140. Similarly, in the embodiments illustrated in FIG. 2, the system 170 includes the components of the gateway 130 as well as the components of the secure data transmission system 180. Similarly, in the embodiments illustrated in FIG. 3, the system 170 includes the components of the gateway 130 as well as the components of the DLP system 190 and the mail server 140.

Moreover, some or all of the components of the network entities which perform analysis and/or security functions (e.g., the scanning module 162, components of the secure data transmission system 180, and the DLP system 190) may be incorporated into the gateway 130. Alternatively, the gateway 130 may be incorporated into existing systems/entities which perform the above-mentioned analysis and/or security functions.

The gateway 130 includes an interface 132 for exchanging packets with the user computer 120 and the various network entities that facilitate the transmission of data items (e.g., the mail server 140, the DLP system 190, and the secure data transmission system 180) through the network 110, a central processing unit (CPU) 134, a storage/memory 136. The processors of the CPU 134 and the storage/memory 136, although shown as a single component for representative purposes, may be multiple components. Although not shown in the drawings, the gateway 130 may include additional components and/or modules which are typically found in gateways as known in the art, such as, for example, operating systems for managing resources and providing common services for programs run on the gateway 130.

Figure 5:
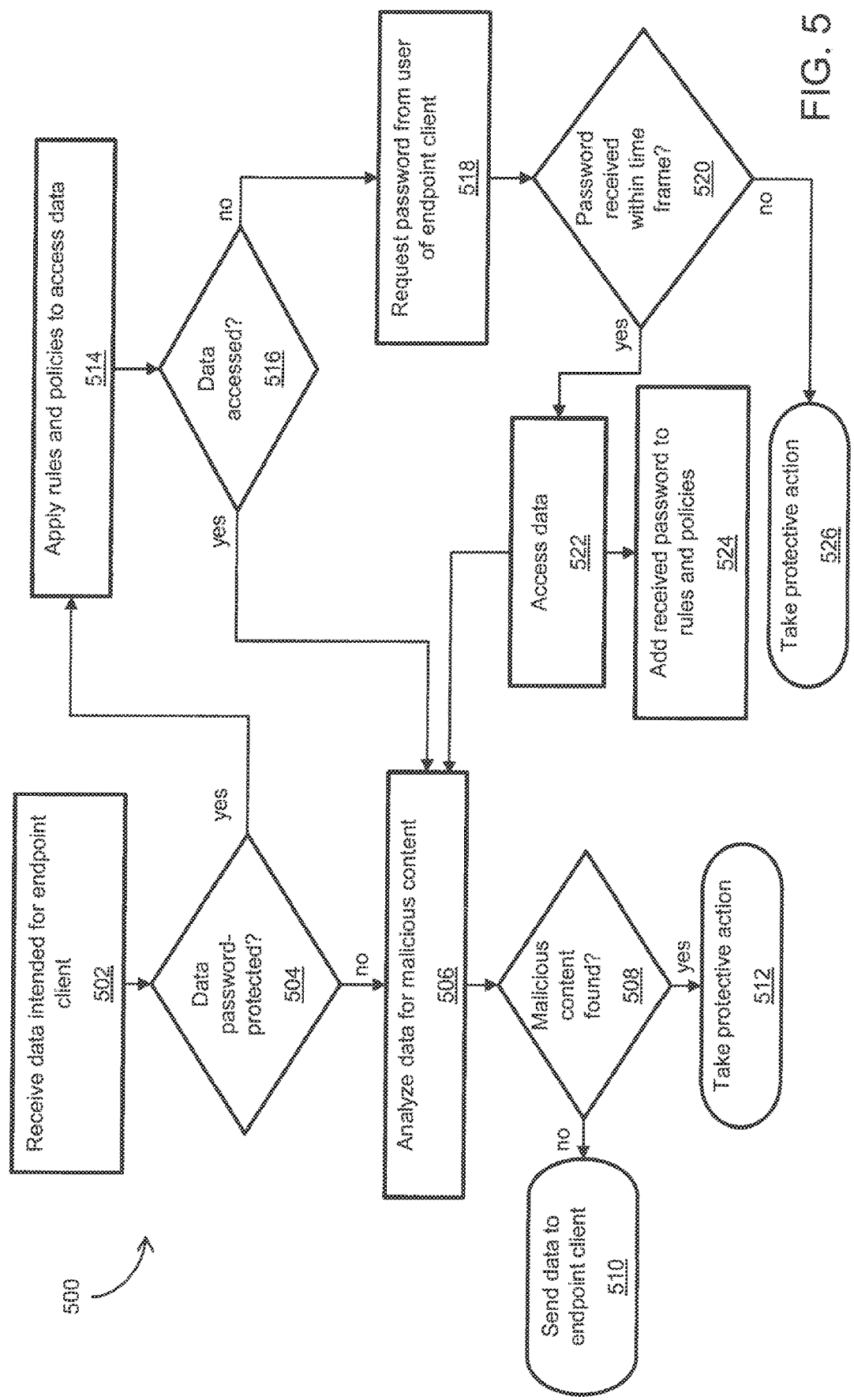
Figure 6:
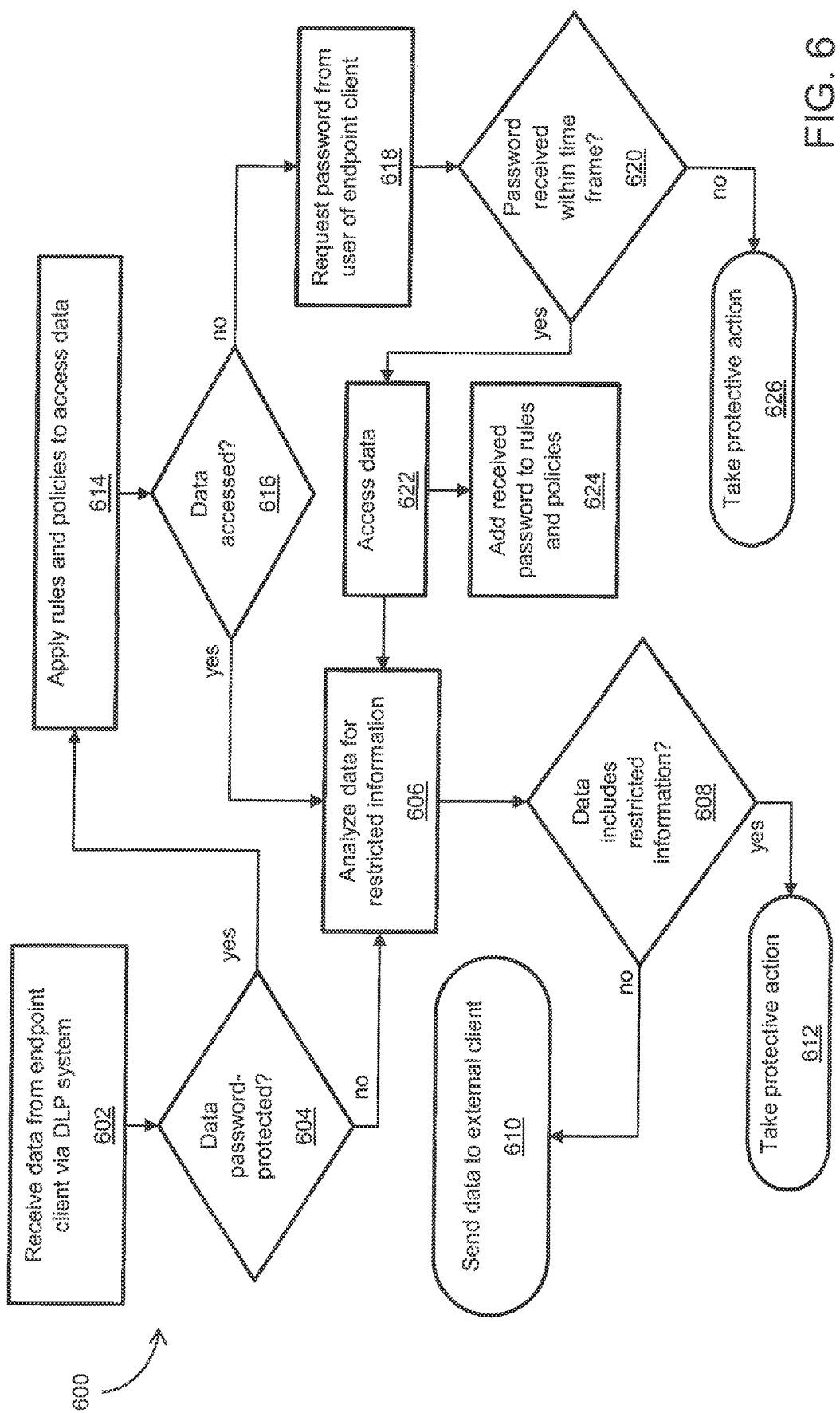

The CPU 134 is formed of one or more processors, including microprocessors, for performing the functions of the gateway 130, including executing the functionalities and operations of the agent 160, as detailed herein, and including the processes shown and described in the flow diagrams of FIGS. 5 and 6. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 136 is any conventional storage media. The storage/memory 136 stores machine executable instructions for execution by the CPU 134, to perform the processes of the present embodiments. The storage/memory 136 also includes machine executable instructions associated with the operation of the components, including the agent 160, and instructions for executing the at least some of the sub-processes of the processes of FIGS. 5 and 6, detailed herein.

The gateway 130 may further include a database 138 which retains information, in a structured format, used for accessing password-protected data items by the gateway 130. The contents and operation of the database 138 will be described in further detail in subsequent sections of the present disclosure.

Although the receipt of password-protected data items on the user computer 120 has been described thus far through the exemplary illustrations of the mail server 140 in FIG. 1 and the secure data transmission system 180 in FIG. 2, other data receiving methodologies and techniques are possible, including, but not limited to, file downloaders, agents, file transfer protocol (FTP), and other network based protocols used for transferring data to an endpoint client via a network.

The agent 160 is, for example, software which runs as a background process on the operating system of the gateway 130. According to certain embodiments of the present disclosure, the agent 160 provides mechanisms for receiving password-protected data items (FIGS. 1 and 2). In such embodiments, the gateway 130, with the agent 160 installed thereon, provides a sandboxed environment, in which password-protected data items, when accessed, are kept on the gateway 130 (and may be discarded) in isolation from the user computer 120. In other embodiments of the present disclosure, the agent 160 provides mechanisms for preventing exfiltration of restricted information (FIG. 3). in such embodiments, the gateway 130, with the agent 160 installed thereon, provides a sandboxed environment, in which password-protected data items, when accessed, are kept on the gateway 130 (and may be discarded) in isolation from the network 110 and computers linked to the network 110 which are external to the enterprise 100.

Refer again to the illustrative example environment of FIG. 1, and to the architecture of gateway 130 of FIG. 4. In an exemplary series of processes to receive data items, the system 170 receives a file from the network 110. The file is sent from a source (i.e., a sender) linked to the network 110, as an attachment to an e-mail intended for receipt by the user computer 120, via the mail server 140. In other words, the e-mail (and attached file) is addressed to the user of the user computer 120. The file received by the system 170 may be a password-protected file (i.e., a password-protected archive file) or may be a typical unprotected file. Password-protected archive files, as mentioned above, include one or more data items stored in a compressed/encrypted/password-protected format. Within the context of this document, the data items stored in a password-protected file are referred to as "local data items" or "local files".

The system 170 determines whether or not the received file is a password-protected file. If the received file, as determined by the system 170, is not a password-protected file, the system 170 handles the received file in accordance with typical file handling methodologies of unprotected (i.e., non-password protected and/or non-encrypted) files received over a network. The typical file handling may include providing the received file to the user computer 120, and preferably includes inspecting the received file for malicious components (i.e., anti-virus scanning) via the scanning module 162. If the received file lacks malicious components, as indicated by the scanning module 162, the system 170 forwards the received file to the user computer 120. If the received file includes malicious components, indicated by the scanning module 1.62, the system 170 may initiate (by signaling) the taking of protective action to protect the user computer 120. For example, protective actions may include remediation actions such as: 1) quarantining the received file; 2) alerting or notifying a system administrator about the security incident; 3) notifying the user of the user computer 120 about the security incident; and 4) discarding the received file.

If the received file, as determined by the system 170, is a password-protected file, the system 170 applies a set of rules and policies to attempt to access the password-protected data item. Within the context of this document, the term "access", with respect to a password-protected file, generally refers to reversion of the local data items in the archive file to their original form. For example, accessing a password-protected file includes decompressing and decrypting the local data items stored in the password-protected file.

In a non-limiting implementation, the application of the set of rules and policies includes applying potential passwords which may be assigned to the password-protected file, in an attempt to access the password-protected file by the system 170 (i.e., the agent 160). The potential passwords are preferably stored in the database 138, and includes a list of common passwords used to assign to password-protected files. Although FIG. 4 illustrates the database 138 as being installed on the gateway 130, the database 138 may be remotely located from the gateway 130, for example, hosted on a remote server or website.

The application of the rules and policies is referred to interchangeably as a "brute force approach" to attempting to access the password-protected file. If the system 170 successfully accesses the password-protected file using one of the potential passwords, the system 170 handles the accessed password-protected file in a manner similar to the handling of unprotected files by the system 170, specifically by inspecting the accessed password-protected file for malicious components (i.e., anti-virus scanning) via the scanning module 162, and performing actions based on the scanning outcome, similar to as described above. If the system does not successfully access the password-protected file using any of the potential passwords, the system 170 sends a request to the user of the user computer 120 for the password assigned to the password-protected file. In a non-limiting implementation, the system 170 delivers the request to the user of the user computer 120 via e-mail, however, other delivery methods may be used. As mentioned above, the user of the user computer 120 receives the password-protected file from a sender, who typically supplies the user of the user computer 120 with the assigned password required to access the password-protected file. As such, the assigned password may often be in the possession of the user of the user computer 120.

If the user of the user computer 120 supplies the system 170 with the assigned password within a prescribed time frame (e.g., within 5 minutes of the request for the assigned password), the system 170 applies the assigned password to the password-protected file in order to access the password-protected tile. The system 170 then handles the accessed password-protected file in a manner similar to the handling of unprotected files by the system 170, specifically by inspecting the accessed password-protected file for malicious components (i.e., anti-virus scanning) via the scanning module 162, and performing actions based on the scanning outcome, similar to as described above. If the user of the user computer 120 fails to provide the system 170 with the assigned password within the defined time frame, the system 170 may initiate (by signaling) the taking of protective action to protect the user computer 120. For example, protective actions may include actions such as: 1) quarantining the password-protected file; 2) displaying a message, warning window, or the like, on the user computer 120, 3) alerting or notifying a system administrator about the security incident; 4) notifying the user of the user computer 120 about the security incident; 5) quarantining the user computer 120 by blocking the user computer 120 from communicating with other computers of the enterprise 100 and/or from accessing the network 110, or otherwise disconnecting the user computer 120 from the enterprise private network and/or the network 110; and 6) discarding the password-protected received file.

The above mentioned exemplary processes allow a user of the user computer 120 to receive files, accessed from password-protected files, without exposing the user computer 120 to malicious or potentially harmful components embedded within the password-protected files. This may be exemplified by scenarios, for example, in which a user of the user computer 120 receives an e-mail from a sender, known or unknown to the user, which includes a password-protected file as an attachment that may include potentially harmful components. To this end, the system 170, and in particular the gateway 130, operates as a sandbox which handles the password-protected files.

As discussed above, certain embodiments of the present disclosure provide a connection between the gateway 130 and a secure data transmission system 180, which provides a secure channel of communication for transmission of data items, preventing tampering or access (by unauthorized parties) to the data items while in transit (i.e., exchanged) between the server 150 and the user computer 120. The secure data transmission system 180 may provide privileged account security for services, such as, for example, financial services and transactions, energy, retail and healthcare markets. As such, the secure data transmission system 180 may he applied to exchanges of files that include sensitive information, such as, for example, financial account information, consumer identification information, and patient information. The secure data transmission system 180 may be an existing system, integrated with or cooperating with the gateway 130, such as, for example, one of the systems provided by CyberArk of Newton Mass.

Referring again to the illustrative example environment of FIG. 2, and to the architecture of gateway 130 of FIG. 4, the system 170 performs an exemplary series of processes to receive data items. It is noted that the description of the exemplary series of processes performed by the system 170, when deployed in the illustrative example environment of FIG. 2, is generally similar to the exemplary series of processes performed by the system 170, when deployed in the illustrative example environment of FIG. 1, unless expressly stated otherwise, and will be understood by analogy thereto.

A specific feature of the exemplary series of processes performed by the system 170, when deployed in the illustrative example environment of FIG. 2, that is different from the exemplary series of processes performed by the system 170, when deployed in the illustrative example environment of FIG. 1, is related to the scanning module used for inspecting accessed password-protected files for malicious content or components. Typically, the secure data transmission system 180 includes malicious scanning modules and software (i.e., the secure scanning module 164), which are specifically provided by the secure data transmission system 180, As such, the inspection of the accessed password-protected files is performed by the secure scanning module 164. The accessed password-protected files which do not include malicious content or components, based on the inspection by the secure scanning module 164, are provided to the secure inbound module 184, which handles delivery of the accessed password-protected files to the user computer 120. In all other aspect Attention is now directed to FIG. 5 which shows a flow diagram detailing a computer-implemented process 500 in accordance with embodiments of the disclosed subject matter. This computer-implemented process includes an algorithm for receiving data items. Reference is also made to the elements shown in FIGS. 1, 2 and 4. The process and sub-processes of FIG. 5 are computerized processes performed by the system 170, including, for example, the CPU 134 and associated components, such as the agent 160 and the scanning module 162 (or the secure scanning module 164). The aforementioned processes and sub-processes are for example performed automatically, but can be, for example, performed manually, and are performed, for example, in real-time.

The process 500 begins at block 502, where a file is received from the network 110 by the system 170. As mentioned above, the file is sent from a source (i.e., a sender) linked to the network 110, as an attachment to an e-mail intended for receipt by the user computer 120. Note that when the system 170 is deployed as shown in the illustrative example environment of FIG. 2, the file may be received via the secure outbound module 182. The process 500 then moves to block 504, where the systems 170 determines whether the received file is a password-protected file (i.e., a password-protected archive file). The system 170 may determine whether the received file is password-protected by inspecting file header information of the local files. It is noted that such file header information is accessible and readable even when the local files are stored in a password-protected file. Such file header information typically describes compression parameters, and may therefore provide an indication of whether the received file is a password-protected file.

If the received file is not a password-protected file, as determined by the system 170 in block 504, the process 500 moves to block 506, where the received file is analyzed and inspected for malicious content or components by a malware inspection module. In a non-limiting implementation, the malware inspection module may be the scanning module 162. Alternatively, the malware inspection module may be a local anti-virus scanning tool installed on the user computer 120. When the system 170 is deployed as shown in the illustrative example environment of FIG. 2, the malware may be the secure scanning module 164. The process then moves to block 508, where the system 170 determines handling of the received file based on the result of the execution of block 506.

If the received file does not include any malicious content or components, as determined by the execution of block 506, the process 500 moves from block 508 to block 510, where the received file is forwarded to the user computer 120 by the system 170. Note that when the system 170 is deployed as shown in the illustrative example environment of FIG. 2, the file is forwarded to the user computer 120 via the secure inbound module 184. If the received file includes malicious content or components, as determined by the execution of block 506, the process 500 moves from block 508 to block 512, where the system 170 may initiate (by signaling) the taking of protective action to protect the user computer 120 and the enterprise 100. Such protective actions may include, for example, one or more of: 1) quarantining the received file; 2) alerting or notifying a system administrator about the security incident; 3) notifying the user of the user computer 120 about the security incident; and 4) discarding the received file.

Returning to block 504, if the received file is a password-protected file, as determined by the system 170, the process 500 moves to block 514, where the system 170 applies a set of rules and policies to attempt to access the password-protected file. As mentioned above, the rules and policies may include performing a brute force technique of applying potential passwords which may be assigned to the password-protected file. The application of the potential passwords may include receiving or accessing a listing of common passwords used for password-protecting archive files, and checking whether any of the passwords in the listing successfully accesses the password-protected file. The checking may be performed by testing the passwords in the listing sequentially, or may be performed by testing a group of passwords in the listing in parallel. The listing of common passwords may be stored in the database 138, or may be stored in a web-accessible repository, such as, for example, in an on-line database, web server, or remote server.

It is noted herein that passwords used for password-protecting archive files are typically less secure than passwords used to securely access assets, such as, for example, bank account passwords and e-mail passwords. For example, passwords used for password-protecting archive files commonly include simple alphanumeric combinations, and may therefore be retrieved by performing brute force techniques.

From block 514, the process 500 moves to block 516, where the system 170 determines if the password-protected file is accessed as a result of the execution of block 514. In other words, if the system 170 successfully applies the assigned password using the brute force approach of block 514, the process 500 moves from block 516 to block 506.

If the system 170 does not successfully apply the assigned password using the brute force approach of block 514, the process 500 moves from block 516 to block 518, where the system 170 requests the password assigned to the password-protected file from the user of the user computer 120. As mentioned above, the request may be in the form of an e-mail, sent by the system 170, to the user of the user computer 120. The request may include a message indicating that a password-protected file, addressed to the user computer 120, has been received by the system 170, and that the system requires the user of the user computer 120 to supply the system 170 with the password assigned to the password-protected file. The request may further include a message indicating that the assigned password be provided by the user of the user computer 120, to the system 170, within a prescribed amount of time from the receipt of the request. The user of the user computer 120 may provide the password assigned to the password-protected file to the system 170 via a reply e-mail.

The process 500 then moves to block 520, where the system 170 determines if the password assigned to the password-protected file is received from the user of the user computer 120 within the specified time frame. If the assigned password is received within the specified time frame, the process 500 moves to block 522, where the password-protected file is accessed by the system 170. The process 500 then moves to block 506. The process 500 may also move to block 524, from block 522, where the system 170 adds the assigned password to the listing of common passwords, stored, for example, in the database 138.

If the assigned password is not received within the specified time frame, the process 500 moves to block 526, where the system 170 may initiate (by signaling) the taking of protective action to protect the user computer 120 and the enterprise 100. Such protective actions may include, for example, one or more of: 1) quarantining the password-protected file; 2) displaying a message, warning window, or the like, on the user computer 120, 3) alerting or notifying a system administrator about the security incident; 4) notifying the user of the user computer 120 about the security incident; 5) quarantining the user computer 120 by blocking the user computer 120 from communicating with other computers of the enterprise 100 and/or from accessing the network 110, or otherwise disconnecting the user computer 120 from the enterprise private network and/or the network 110; and 6) discarding the password-protected received file.

Note that in response to the request for the assigned password, by the system 170, as performed in block 518, the user of the user computer 120 may supply (unintentionally) the incorrect password (i.e., does not allow access to the password-protected file). Although not shown in FIG. 5, the system 170 may send subsequent requests to the user of the user computer 120 for the assigned password if the password received (from the user computer 120 by the system 170) does not allow access to the password-protected file.

While the exemplary series of processes performed by the system 170, when deployed in the illustrative example environments of FIGS. 1 and 2, provide a sandboxed environment which protects the user computer 120 from receiving malicious or potentially harmful components embedded in local files stored in password-protected files, the gateway 130 (and system 170) of the present disclosure may also provide a sandboxed environment which prevents data breaches, for example, by way of exfiltration of restricted information embedded in local files stored in password-protected files. As mentioned above, certain embodiments of the present disclosure provide a connection between the gateway 130 and a DLP system 190, which cooperate to prevent such data breaches, either knowingly or unknowingly, by the user of the user computer 120.

Referring again to the illustrative example environment of FIG. 3, and to the architecture of the gateway 130 of FIG. 4, the system 170 performs an exemplary series of processes to prevent exfiltration of data. The system 170 receives a file intended for the network 110, via the DLP system 190. The file is sent from the user computer 120, for example as an attachment to an e-mail, and is addressed to (i.e., is intended for receipt by) the recipient computer 150', via the mail server 140 through the network 110. The recipient computer 150' is a computer or electronic device which is not part of the enterprise 100, is should not receive information classified as restricted by the DU system 190. The file received by the system 170 may be a password-protected file (i.e., a password-protected archive file) or may be a typical unprotected file.

The system 170 determines whether or not the received file is a password-protected file. if the received file, as determined by the system 170, is not a password-protected file, the system 170 instructs the DLP system 190 to handle the file in accordance with typical DLP file handling methodologies of unprotected (i.e., non-password protected and/or non-encrypted). Typical handling includes inspecting the received file for restricted information which may be embedded in the file. As mentioned above, restricted information generally refers to information that is private or sensitive and should not otherwise be distributed to computers outside of the enterprise 100. For example, if the enterprise 100 is deployed at a bank, the restricted information may include personal details of bank clients, such as, for example, social security numbers, account information, home addresses, and the like. Although not shown in the drawings, the DLP system 190 may typically include modules and software for assessing whether or not a given file includes restricted information.

If the received file lacks restricted information, as indicated by the DLP system 190, the system 170 forwards the received file to the mail server 140 for delivery to the recipient computer 150'. If the received file includes restricted information, as indicated by the DLP system 190, the system 170 may initiate (by signaling) the taking of protective action to prevent the data breach. For example, protective actions may include actions such as: 1) displaying a message, warning window, or the like, on the user computer 120 that an attempted data breach was initiated by the user computer 120, 2) alerting or notifying a system administrator about the security incident; 3) quarantining the user computer 120 by blocking the user computer 120 from accessing the network 110, or otherwise disconnecting the user computer 120 from the network 110; and 4) discarding the received tile.

If the received file, as determined by the system 170, is a password-protected file, the system 170 applies a set of rules and policies to attempt to access the password-protected data item. Similar to as discussed above with reference to the processes performed by the system 170 when deployed in the illustrative example environments of FIGS. 1 and 2, the set of rules and policies includes the brute force approach of applying potential passwords, stored for example in the database 138, which may be assigned to the password-protected file, in an attempt to access the password-protected file by the system 170 (i.e., the agent 160).

If the system 170 successfully accesses the password-protected file using one of the potential passwords, the system 170 instructs the DLP system 190 to handle the accessed password-protected file in a manner similar to the handling of unprotected files by the system 170, specifically by inspecting the received file for restricted information, and performing actions based on the inspecting outcome, similar to as described above. If the system does not successfully access the password-protected file using any of the potential passwords, the system 170 sends a request to the user of the user computer 120 for the password assigned to the password-protected file. In a non-limiting implementation, the request is delivered to the user of the user computer 120 via e-mail, however, other delivery methods may be used. Since the user of the user computer 120 is the originator of the password-protected file, the assigned password is in the possession of the user of the user computer 120.

If the user of the user computer 120 supplies the system 170 with the assigned password within a prescribed time frame (e.g., within 5 minutes of the request for the assigned password), the system 170 applies the assigned password to the password-protected file in order to access the password-protected file. The system 170 instructs the DLP system 190 to handle the accessed password-protected file in a manner similar to the handling of unprotected files by the system 170, specifically by inspecting the received file for restricted information, and performing actions based on the inspecting outcome, similar to as described above. If the user of the user computer 120 fails to provide the system 170 with the assigned password within the defined time frame, the system 170 may initiate (by signaling) the taking of protective action to protect the user computer 120. For example, protective actions may include actions such as: 1) displaying a message, warning window, or the like, on the user computer 120 that an attempted data breach may have been initiated by the user computer 120, 2) alerting or notifying a system administrator about the potential data breach; 3) quarantining the user computer 120 by blocking the user computer 120 from accessing the network 110, or otherwise disconnecting the user computer 120 from the network 110; and 4) discarding the received file.

The above mentioned exemplary processes prevent the user of the user computer 120 from sending password-protected files, which have restricted information embedded in local files stored in password-protected files, to computers outside of the enterprise 100.

Attention is now directed to FIG. 6 which shows a flow diagram detailing a computer-implemented process 600 in accordance with embodiments of the disclosed subject matter. This computer-implemented process includes an algorithm for preventing exfiltration of restricted information, by a computer of an enterprise, to computers and electronic devices outside of the enterprise. Reference is also made to the elements shown in FIGS. 3 and 4. The process and sub-processes of FIG. 6 are computerized processes performed by the system 170, including, for example, the CPU 134 and associated components, such as the agent 160 and the DLP system 190. The aforementioned processes and sub-processes are for example performed automatically, but can be, for example, performed manually, and are performed, for example, in real-time.

The process 600 begins at block 602, where a file is received the system 170, via the DLP system 190, that is intended for the network 110. As mentioned above, the file is sent from the user computer 120, for example as an attachment to an e-mail intended for receipt by the recipient computer 150', which is a computer or electronic device which is not part of the enterprise 100.

The process 600 then moves to block 604, where the systems 170 determines whether the received file is a password-protected file (i.e., a password-protected archive file). The system 170 may determine whether the received file is password-protected by inspecting file header information of the local files, similar to as described above with reference to the process 500 and FIG. 5.

If the received file is not a password-protected file, as determined by the system 170 in block 604, the process 600 moves to block 606, where the received file is analyzed and inspected for restricted information embedded in the received file. The analysis and inspection is performed by the DLP system 190. The process then moves to block 608, where the system 170, in particular the DLP system 190, determines handling of the received file based on the result of the execution of block 606.

If the received file does not include any restricted information embedded in the received file, as determined by the execution of block 606, the process 600 moves from block 608 to block 610, where the received file is forwarded, by the system 170, to mail server 140 for delivery to the recipient computer 150'. Preferably, the password required to access the password-protected file is forwarded, by the system 170, to mail server 140 for delivery to the recipient computer 150'. In this way, the recipient computer 150' is able to receive the password-protected file and assigned password, as intended by the user of the user computer 120.

If the received file includes restricted information embedded in the received file, as determined by the execution of block 606, the process 600 moves from block 608 to block 612, where the system 170 may initiate (by signaling) the taking of protective action to prevent the data breach. Such protective actions may include, for example, one or more of: 1) displaying a message, warning window, or the like, on the user computer 120 that an attempted data breach was initiated by the user computer 120, 2) alerting or notifying a system administrator about the security incident; 3) quarantining the user computer 120 by blocking the user computer 120 from accessing the network 110, or otherwise disconnecting the user computer 120 from the network 110; and 4) discarding the received file.

Returning to block 604, if the received file is a password-protected file, as determined by the system 170, the process 600 moves to block 614, where the system 170 applies a set of rules and policies to attempt to access the password-protected file. As mentioned above, the rules and policies may include performing a brute force technique of applying potential passwords which may be assigned to the password-protected file. The application of the potential passwords may include receiving or accessing a listing of common passwords used for password-protecting archive files, and checking whether any of the passwords in the listing successfully accesses the password-protected file. The checking may be performed by testing the passwords in the listing sequentially, or may be performed by testing a group of passwords in the listing in parallel. The listing of common passwords may be stored in the database 138, or may be stored in a web-accessible repository, such as, for example, in an on-line database, web server, or remote server.

From block 614, the process 600 moves to block 616, where the system 170 determines if the password-protected file is accessed as a result of the execution of block 614. In other words, if the system 170 successfully applies the assigned password using the brute force approach of block 614, the process 600 moves from block 616 to block 606.

If the system 170 does not successfully apply the assigned password using the brute force approach of block 614, the process 600 moves from block 616 to block 618, where the system 170 requests the password assigned to the password-protected tile from the user of the user computer 120. As mentioned above, the request may be in the form of an e-mail, sent by the system 170, to the user of the user computer 120, The request may include a message indicating that an attempt to send a password-protected file to a computer outside of the enterprise 100 (i.e., the recipient computer 150'), has been detected by the system 170, and that the system requires the user of the user computer 120 to supply the system 170 with the password assigned to the password-protected file. The request may further include a message indicating that the assigned password be provided by the user of the user computer 120, to the system 170, within a prescribed amount of time from the receipt of the request. The user of the user computer 120 may provide the password assigned to the password-protected file to the system 170 via a reply e-mail.

The process 600 then moves to block 620, where the system 170 determines if the password assigned to the password-protected file is received from the user of the user computer 120 within the specified time frame. If the assigned password is received within the specified time frame, the process 600 moves to block 622, where the password-protected file is accessed by the system 170. The process 600 then moves to block 606. The process 600 may also move to block 624, from block 622, where the system 170 adds the assigned password to the listing of common passwords, stored, for example, in the database 138.

If the assigned password is not received within the specified time frame, the process 600 moves to block 626, where the system 170 may initiate (by signaling) the taking of protective action to protect the user computer 120 and the enterprise 100. Such protective actions may include, for example, one or more of 1) displaying a message, warning window, or the like, on the user computer 120 that an attempted data breach may have been initiated by the user computer 120, 2) alerting or notifying a system administrator about the potential data breach; 3) quarantining the user computer 120 by blocking the user computer 120 from accessing the network 110, or otherwise disconnecting the user computer 120 from the network 110; and 4) discarding the received file.

Note that in response to the request for the assigned password, by the system 170, as performed in block 618, the user of the user computer 120 may supply (unintentionally) the incorrect password (i.e., does not allow access to the password-protected file). Although not shown in FIG. 6, the system 170 may send subsequent requests to the user of the user computer 120 for the assigned password if the password received (from the user computer 120 by the system 170) does not allow access to the password-protected file.

As discussed above, by applying the rules and policies (i.e., the brute force approach), the system 170, in particular the gateway 130, may successfully retrieve the assigned password from the listing of common passwords, and apply the assigned password to the password-protected file and access the password-protected file. It is noted herein that the application of the rules and policies to the password-protected file, by the system 170 in the embodiments of the present disclosure as described above, is generally transparent to the user of the user computer 120. As such, application of the assigned password to the password-protected file and access of the password-protected file, resultant from the successful retrieval of the assigned password from the listing of common passwords, is achieved by the system 170 without alerting the user of the user computer 120 and without the user of the user computer 120 being aware of the password application and resultant file access.

It is noted herein that as a result of the rules and policies (i.e., the brute force approach) and the request for the assigned password from the user of the user computer 120, as performed by the system 170 in the embodiments of the present disclosure as described above (i.e., the execution of blocks 514, 614 and blocks 518, 618), a tradeoff exists between the execution time and resources consumed by the components of the gateway 130, and the inconvenience of disrupting the day-to-day activity of the user of the user computer 130 by sending a password request. For example, execution of the brute force approach to identify and apply the password assigned to the password-protected file may consume a certain amount of resources by the CPU 134 and/or may occupy a certain amount of disk space by the storage/memory 136. In addition, execution of the brute force approach to identify and apply the password assigned to the password-protected file may take a prescribed amount of time before the correct password is identified by the system 170. These factors may be weighed and compared, by the system 170, against the inconvenience factor of disrupting and/or disturbing the user of the user computer 120 with a request for the password assigned to a password-protected file.

As such, if the resources consumed by the CPU 134 exceed a threshold criterion resultant from and during performance of the brute force approach, the system 170 may interrupt the brute force approach and request the assigned password from the user of the user computer 120. In other words, the system 170 may request the assigned password from the user prior to exhaustion of the list of potential passwords, if the resources consumed by the CPU 134, resultant form the execution of the brute force approach, exceed a threshold criterion (e.g., a maximum number of CPU resources).

Similarly, if the disk space occupied by the storage/memory 136 exceed a threshold criterion resultant from and during performance of the brute force approach, the system 170 may interrupt the brute force approach and request the assigned password from the user of the user computer 120. In other words, the system 170 may request the assigned password from the user prior to exhaustion of the list of potential passwords, if the disk space occupied by the storage/memory 136, resultant form the execution of the brute force approach, exceed a threshold criterion (e.g., a maximum amount of disk space).

Similarly, if the time spent performing the brute force approach exceeds a threshold criterion, the system 170 may interrupt the brute force approach and request the assigned password from the user of the user computer 120. In other words, the system 170 may request the assigned password from the user prior to exhaustion of the list of potential passwords, if the time spent performing the brute force approach exceeds a threshold criterion (e.g., a maximum execution time).

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will he apparent to those skilled in the art. Accordingly, it is intended to embrace all such alternatives, modifications and variations that fall within the spirit and broad scope of the appended claims.

What is claimed is:

1. A method for determining whether data received over a network includes potentially malicious components, the method comprising:
   receiving data from the network, at an entity coupled to the network, wherein the entity includes a gateway;
   determining whether the data is password-protected data by inspecting file header information of the data, the password-protected data intended for receipt by a user of an endpoint coupled to the network, and having an assigned password allowing access to the password-protected data;
   applying a set of rules and policies to the password-protected data while not reaching a threshold criterion of system resources consumed in attempt to access the password-protected data, the threshold criterion selected from a group consisting of a maximum number of CPU resources, a maximum amount of disk space, a maximum execution time, or combinations thereof, based on one of the following:
   (1) the outcome of the applied rules and policies and
   (2) reaching of said threshold criterion, requesting the assigned password from a user of the endpoint to access the password-protected data and determining whether the password-protected data includes potentially malicious components;
   taking at least one protective action to protect the endpoint, in the absence of receiving the assigned password, in response to the requesting, from the user of the endpoint; and
   accessing the data if the assigned password is received.

2. The method of claim 1, further comprising: receiving the assigned password, in response to the requesting, from the user of the endpoint.

3. The method of claim 2, further comprising: adding the received assigned password to a listing of potential passwords.

4. The method of claim 2, further comprising: applying the received assigned password to the password-protected data; and accessing the password-protected data.

5. The method of claim 4, further comprising analyzing the accessed password-protected data to determine whether the password-protected data includes malicious components.

6. The method of claim 1, wherein the gateway receives the password-protected data from a mail server installed between the endpoint and the network.

7. The method of claim 1, wherein the gateway receives the password-protected data from a secure data transmission system having at least one component installed between the endpoint and the network.

8. The method of claim 1, wherein the password-protected data is encrypted.

9. The method of claim 1, wherein the applying the set of rules and policies includes applying a series of potential passwords to the password-protected data.

10. A gateway for determining whether data received data over a network includes potentially malicious components, the gateway comprising:
    a memory for storing computer components; and
    a computerized hardware processor for executing the computer components comprising:
    a computer module configured for;
    receiving data from the network,
    determining whether the data is password-protected data by inspecting file header information of the data, the password-protected data intended for receipt by a user of an endpoint coupled to the network and the gateway, and having an assigned password allowing access to the password-protected data;
    applying a set of rules and policies to the password-protected data while not reaching a threshold criterion of system resources consumed in attempt to access the password-protected data, the threshold criterion selected from a group consisting of a maximum number of CPU resources, a maximum amount of disk space, a maximum execution time, or combinations thereof, based on one of the following:
    (1) the outcome of the applied rules and policies and
    (2) reaching of said threshold criterion, requesting the assigned password from a user of the endpoint to access the password-protected data and determining whether the password-protected data includes potentially malicious components;
    taking at least one protective action to protect the endpoint, in the absence of receiving the assigned password, in response to the requesting, from the user of the endpoint; and
    accessing the data if the assigned password is received.

11. The gateway of claim 10, wherein the password-protected data is received from a mail server installed between the endpoint and the network.

12. The gateway of claim 10, wherein the password-protected data is received from a secure data transmission system having at least one component installed between the endpoint and the network.

13. The gateway of claim 10, wherein the gateway is deployed in a sandboxed environment isolating the password-protected data, when accessed, from the endpoint.

* * * * *